Patented Dec. 18, 1945

2,391,297

UNITED STATES PATENT OFFICE 2,391,297

TARTAR EMETIC MANUFACTURE

Newell A. Davies, Burlingame, Calif., assignor to Stauffer Chemical Company, a corporation of California No Drawing. Application July 10, 1944,
Serial No. 544,335

10 Claims. (Cl. 260—446)

This invention relates to the manufacture of tartar emetic, potassium antimonyl tartrate. Heretofore tartar emetic has been usually manufactured by reacting previously prepared and highly purified potassium bitartrate in aqueous solution with freshly prepared antimony trioxide. The present invention is concerned with the manufacture of tartar emetic from comparatively impure sources such as semi-refined cream tartar containing between 95% and 97% potassium bitartrate as well as from argols and lees. These materials respectively usually include between 60% to 85% potassium bitartrate and 20% to 60% potassium bitartrate along with dirt, organic matter and various salts including calcium tartrate.

Semi-refined cream tartar, containing less than about 95% potassium bitartrate, for example, has heretofore been considered an unlikely bitartrate source because the impurities have usually included calcium in a form which appears in the final product as calcium tartrate. Unless this is removed by special treatment it is carried through as an impurity and consequently lowers the tartar emetic content to an objectionable extent.

Lees and argols usually contain complex organic matter such as tannin, vegetable coloring matter, pectins, albuminoids and the like which I have found interfere with the reaction with the antimony trioxide. This is so even in the case of high grade argols which are substantially free of calcium. The organic matter apparently interferes with the antimony trioxide reaction by selective absorption on the surfaces of the oxide particles, a "poisoning" of the oxide rendering it incapable of reaction with the tartrate. This "poisoning" results in a large decrease in the reactivity of the antimony trioxide and a resulting lowering of the yield and purity of the product. Additions of large excesses (50% to 100%) only partially overcome this poisoning. Inasmuch as the oxide is quite expensive, this solution is an impractical one. The crude materials may also contain calcium tartrate in amounts as high as 20%. Previous processes for manufacture of tartar emetic have not utilized this tartrate and it has been wasted. In accordance with this invention, calcium tartrate is utilized as a source of tartar emetic.

I have discovered that calcium tartrate can be successfully eliminated as an objectionable constituent and made available as tartar emetic by the addition of oxalic acid to the reaction medium. The addition of this acid also has a desirable effect upon the pH of the reaction mixture and this is so whether or not it is utilized to eliminate the calcium as insoluble calcium oxalate and make the tartrate available as tartaric acid. In this connection I also wish to point out that I have determined that, irrespective of the presence of calcium tartrate, the pH of the aqueous solution of potassium bitartrate is preferably maintained at a relatively high acidity, preferably between a pH of about 1 to about 3. Under these conditions, the reaction rate is materially and advantageously increased.

When crude sources of potassium bitartrate containing organic matter normally interfering with the reaction with antimony trioxide are employed, I have found that the deleterious effect of the organic matter can be overcome if sufficient activated carbon is added. Usually an amount of from about 1% to about 10% by weight suffices on the basis of the weight of crude source material employed. With high grade argols of about 85% potassium bitartrate, about 3% of activated carbon is sufficient. With less, a quantity of activated carbon in excess of 10% may be required. As a suitable material I have employed an activated carbon of relatively high activity such as Darco or Nu-Char. Animal bone coal and animal chars are usually not suitable because they include too large a quantity of soluble salts and their activity is usually too low. The utility of the active carbon is not dependent on the prior removal of calcium tartrate. It is essential to practice of the present invention that a good grade of an active carbon be employed, and that this be applied to the crude material prior to addition of the antimony oxide. The use of animal charcoal as applied to refining of previously produced tartar emetic has been previously suggested by Chemnitius in an article entitled, "Zur technischen Darstellung des Brechweinsteins" in Chemiker Zeitung, vol. 54, March 15, 1930.

The following examples represent operations conducted in accordance with the present invention. They are set forth by way of example and not by way of limitation.

*Examples 1-4*

To illustrate Chemnitius' process and that of the present invention, I weighed out four 50 gram batches from a commercial argols of 75% purity. The first mass was treated according to Chemnitius, 50 grams of argols being added to 170 milliliters of boiling distilled water and while the mixture was boiling 44 grams of antimony oxide were gradually introduced in the course of an hour. To the liquor was added a mixture of 3.4 grams of oxalic acid and 1.7 grams of potassium carbonate. After this had been added, the pH of the liquid was taken and was found to be 3.3. The mass was further boiled for two hours, when 0.15 grams of animal charcoal were added. The supernatant liquid was removed from the solid residue remaining and cooled to crystallize out the tartar emetic formed. The product secured was examined analytically and was found to have a purity of only 89.5%. The yield of tartar emetic was 79.9%. This was computed for each of the four batches on the basis of the total tartar emetic actually produced (including that which crystallized and that present in solution in the mother liquor) compared with that theoretically available on the basis of the original cream tartar content of the argols.

The second batch was treated according to Chemnitius, omitting the carbonate to show the effect of a lower pH, 50 grams of argols being added to 170 milliliters of boiling water. Forty-four grams of antimony oxide were added to the boiling mixture over the course of an hour, then 3.4 grams of oxalic acid were added. After the oxalic acid addition, the pH of the mixture was taken and was found to be 2.6. The mixture was then boiled two hours longer, after which 0.15 gram of animal charcoal was added. The liquid was separated from the solid, cooled, and the tartar emetic crystallized. The product was tested for purity and was found to contain only 93.4% of tartar emetic. The yield of tartar emetic was 86.1%.

The third batch of 50 grams of argols were added to 170 milliliters of water. Two grams (4%) of an activated vegetable carbon were then added and stirred through the mixture. Following this, 33 grams of the same grade of antimony oxide previously employed were added. The pH of the mixture was taken at this point and was found to be 3.9. From previous experience I knew that it was only necessary to boil the mixture for not over 120 minutes to secure complete reaction. At the end of this time the liquid was separated from the solids present, cooled, and the tartar emetic crystallized. It was tested for purity and was found to contain 99.5% tartar emetic. The yield of tartar emetic was 97.2%.

The fourth batch of 50 grams of argols were added to 170 milliliters of boiling water, together with 2 grams of activated vegetable carbon. After stirring the mixture, 2.5 grams of oxalic acid were added, followed by 33 grams of antimony oxide. The pH of the mixture was then taken and was found to be 2.8. From previous experience I knew that it was only necessary to heat the mixture for not over an hour to effect complete reaction. At the end of this time the liquid present was separated from the solids, cooled, and tartar emetic crystallized. The product was found to contain 99.8% tartar emetic. The yield of tartar emetic was 98.7%.

The results from this operation can be tabulated as follows:

|  | Batch 1 | Batch 2 | Batch 3 | Batch 4 |
| --- | --- | --- | --- | --- |
| Total reaction time, hours | 3 | 3 | 2 | 1 |
| pH | 3.3 | 2.6 | 3.9 | 2.8 |
| Activated material added | After | After | Before | Before |
| Yield | 79.9 | 86.1 | 97.2 | 98.7 |
| Purity | 89.5 | 93.4 | 99.5 | 99.8 |

Referring to the results obtained with batches 1 and 2 in the above table, it is to be noted that by operating at a more acid pH, namely, pH 2.6 as against pH 3.3, the yield and purity of the product was increased, even though the activated material employed was added afterward. The marked effect of utilizing a vegetable carbon and adding it prior to addition of the antimony oxide is to be observed by comparing batches 1 and 3. Comparison of results on batches 1, 2 and 4 indicates the effect of the addition of the proper activated material at the proper time, and also the effect of operating at a pH below pH 3.

*Example 5*

As an example of a cyclic process, 118 pounds of an argol containing 100 pounds of potassium bitartrate were heated in a roaster to 125° C. A temperature of between 90° C. and 160° C. can be used, one between 100° C. and 140° C. being preferred. This assists in altering the organic matter present so that any carried over with supernatant liquids filters readily. After roasting for a short time, the material was screened to pass a 60-mesh screen while the oversize was ground in a mill to pass a like screen. While the particles are finely divided, they are not so fine that they will not settle readily when permitted to stand mixed with water. The argols were then added to a reaction vessel having a steam coil in the bottom. Sufficient mother liquor, derived from a previous operation as will be explained, was then added to bring volume in the vessel up to a total of about 180 gallons. Water can be employed instead of mother liquor, but, as will presently appear, the mother liquor is advantageously employed. 3.5 pounds of activated carbon were then added and 3 pounds of oxalic acid; the mixture was stirred to distribute the carbon and to insure solution of the oxalic acid and precipitation of calcium tartrate as calcium oxalate. The oxalic acid added is sufficient to precipitate substantially all of the calcium tartrate as calcium oxalate. I have employed as much as 10 pounds of oxalic acid on a batch of the same weight where the calcium tartrate content was high.

Thereafter the mixture was heated in the reaction vessel to its boiling point. Antimony trioxide was added after the mixture had been brought to the boiling point. It was added in an amount in excess of the stoichiometric requirements, usually about a 5% excess. After about two hours heating was discontinued and the mixture in the vessel was permitted to settle. Supernatant liquor was then drawn off and passed to a filter press to filter off any solids present. The filtrate was then passed to a granulator wherein it was cooled and permitted to crystallize. Supernatant liquor was drawn off and collected while the granulate slurry was centrifuged and the remaining mother liquor drawn off, added to that from the granulator and returned to the first reaction vessel as mother liquor. The product from the centrifugal was then dried and was available as a final product.

The solids removed from the first reaction vessel were added to a second reaction vessel along with the filter cake from the filter. Sufficient water was added to make up a light slurry; the mixture was then heated with steam released into the slurry. 1.5 pounds of potassium carbonate were added. This addition will be presently explained. After the mixture had been heated and agitated for about an hour it was permitted to settle. The solids were removed and discharged to waste while the supernatant liquor was returned to the first reaction vessel to provide additional mother liquor for the next reaction along with the mother liquor derived from the granulators and the centrifugal.

When oxalic acid is added to the first reaction vessel to precipitate the calcium tartrate present as calcium oxalate, antimonyl tartaric acid is formed. This material aids the reaction of potassium bitartrate with antimony trioxide. However, if the concentration of this acid in the mother liquor becomes too high, it can interfere with the yield of tartar emetic. By adding potassium carbonate, the antimonyl tartaric acid is converted to tartar emetic. The potassium carbonate can be and sometimes is added to both the first and second reaction vessels, but I prefer to add it to the second because, in the event of overaddition and the resulting hydrolysis, this state is corrected by the further cooking it will have on being returned to the first reaction vessel. The mother liquor is then returned to the first reaction vessel.

The addition of potassium carbonate prevents the pH from attaining a point whereat corrosion is objectionable. In place of potassium carbonate any other suitable potassium salt can be employed such as potassium bicarbonate. The carbonates are advantageously employed for they liberate $CO_2$ which is evolved from the mother liquor upon heating. When a potassium salt such as potassium chloride is used, hydrochloric acid is liberated. This is undesirable if the mother liquor is to be reused as such. However, if the tartar emetic is to be recovered directly from the mother liquor and the remaining liquor wasted, then such a salt can be employed. If potassium hydroxide is employed, the tendency for hydrolysis to occur is greatly increased, antimony trioxide is precipitated and potassium bitartrate remains in solution.

When the process is conducted with semi-refined cream tartar, the addition of the activated carbon is not necessary because of the absence of organic matter. However, the advantages of the pH range specified are present when oxalic acid is employed, the calcium tartrate being converted to calcium oxalate, precipitated and removed, the tartrate being made available and the pH lowered to below pH 3.

*Examples 6 and 7*

To illustrate the utility of the active vegetable carbon on a material free of calcium tartrate I weighed out two batches of a California refrigeration argols containing 88.1% potassium bitartrate and less than 0.5% of calcium tartrate. The two batches were made up as in Examples 1–4, no acid being employed. 38 grams of antimony oxide were employed because of the higher bitartrate value. No carbon was added to batch 6 while 4% (2 grams) was added to batch 7. The results are shown in the following table.

|  | Batch 6 | Batch 7 |
|---|---|---|
| Total reaction time, hours | 1 | 1 |
| pH | 3.7 | 3.9 |
| Active carbon added | None | Before |
| Yield | 60.3 | 92.3 |
| Purity | 66.1 | 99.1 |

The yields and purity reported on batches 1–4, 6 and 7 are comparable since all are based on the available bitartrate. The benefit of the more acid pH is shown by comparison of batches 3 and 7 with batch 4 and of batch 1 with batch 2. The effect of prior treatment with the active carbon is shown by comparing batches 1, 2 and 6 with batches 3, 4 and 7.

Calcium tartrate, or materials high in this material, can be employed as a source of tartrate. When treated with the equivalent quantities of oxalic acid and potassium carbonate, potassium bitartrate is formed which can be employed as such, the calcium oxalate formed and precipitated being easily removed before formation of tartar emetic. One can employ sodium carbonate or bicarbonate in place of potassium carbonate or in conjunction with it if the sodium salt or sodium-potassium salt is desired.

This is a continuation-in-part of application Ser. No. 441,352 filed May 1, 1942, which application included subject matter claimed in my application Ser. No. 439,725 filed April 25, 1942.

I claim:

1. In the manufacture of tartar emetic by reacting an aqueous solution of potassium bitartrate with solid antimony oxide, the step of heating the mixture in the presence of sufficient oxalic acid to maintain said solution at a pH between about pH 1 and about pH 3 during the reaction.

2. In a process of manufacturing tartar emetic from a crude source material of potassium bitartrate containing organic matter normally interfering with the reaction of the bitartrate and the antimony oxide the steps comprising adding activated carbon to an aqueous mixture of said material in an amount sufficient to eliminate said interfering organic matter, adding oxalic acid in an amount sufficient (1) to precipitate substantially all calcium present as a tartrate as calcium oxalate and (2) to raise the acidity of said aqueous mixture to a pH between about pH 1 and about pH 3 and thereafter reacting the bitartrate present with antimony trioxide to form potassium antimonyl tartrate.

3. In a process of manufacturing tartar emetic from a crude source material of potassium bitartrate containing organic matter normally interfering with the reaction of the bitartrate and solid antimony oxide the steps comprising adding activated carbon to an aqueous mixture of said material in an amount sufficient to eliminate said interfering organic matter, adding oxalic acid in an amount sufficient to precipitate substantially all calcium present as a tartrate as calcium oxalate and thereafter reacting the bitartrate present with antimony trioxide to form potassium antimonyl tartrate.

4. The process of claim 6 wherein the oxalic acid is sufficient to maintain the pH of the aqueous mixture between about pH 1 and about pH 3 during the reaction.

5. The process of claim 6 wherein the potassium salt is potassium carbonate.

6. In a process of manufacturing tartar emetic from a crude source material of potassium bitartrate containing calcium tartrate and organic matter normally interfering with the reaction of the bitartrate and antimony oxide, the steps comprising forming a mixture of said material with water and a liquid fraction previously recovered in said process, adding activated carbon to said mixture in an amount sufficient to eliminate said interfering organic matter, adding oxalic acid in an amount sufficient to precipitate substantially all calcium present as calcium oxalate and form tartaric acid, said liquid fraction containing sufficient antimony to react with said tartartic acid and form antimonyl tartaric acid in said mixture, then adding antimony trioxide in an amount more than sufficient to react with the potassium bitartrate present, settling the mixture after reaction of the bitartrate and oxide and separating a solid fraction and a liquid fraction therefrom, said liquid fraction being that first mentioned herein, heating the solid fraction with water and sufficient of a potassium salt of a weak acid to convert at least some of said antimonyl tartaric acid present to tartar emetic, and separating the heated solid fraction into another solid fraction and another liquid fraction containing said tartar emetic.

7. In a process of manufacturing potassium antimonyl tartrate by reacting antimony trioxide with an aqueous mixture of a material containing a potassium bitartrate value in the presence of organic matter, the steps of forming an aqueous suspension of said material together with activated carbon in an amount from about 1% to 10% by weight of said material, thereafter adding antimony trioxide to said aqueous mixture, and heating the mixture to react the potassium bitartrate and the antimony trioxide to form potassium antimonyl tartrate.

8. In a process of reacting a crude potassium bitartrate source material with antimony oxide, the step of treating an aqueous mixture of said crude bitartrate source material with sufficient activated carbon to adsorb organic matter otherwise interfering with reaction of antimony oxide and the potassium bitartrate, adding antimony trioxide to said aqueous mixture, and heating the mixture to react the potassium bitartrate present with the antimony trioxide to form potassium antimonyl tartrate.

9. In a process of manufacturing potassium antimonyl tartrate by reacting antimony trioxide with an aqueous mixture of a material containing a potassium bitartrate value in the presence of organic matter, the steps of forming an aqueous suspension of said material together with activated carbon in an amount from about 1% to 10% by weight of said material, thereafter adding antimony trioxide to said aqueous mixture, heating the mixture to react the potassium bitartrate and the antimony trioxide to form potassium antimonyl tartrate, and maintaining the mixture during the reaction at a pH between about pH 1 and about pH 3.

10. In a process of reacting a crude potassium bitartrate source material with antimony oxide, the step of treating an aqueous mixture of said crude bitartrate source material with sufficient activated carbon to adsorb organic matter otherwise interfering with reaction of antimony oxide and the potassium bitartrate, adding antimony trioxide to said aqueous mixture, heating the mixture to react the potassium bitartrate present with the antimony trioxide to form potassium antimonyl tartrate, and maintaining the mixture during the reaction at a pH between about pH 1 and about pH 3.

NEWELL A. DAVIES.